United States Patent [19]

Roberts et al.

[11] 4,351,381
[45] * Sep. 28, 1982

[54] TREAD FOR PNEUMATIC TIRE

[75] Inventors: Charles W. Roberts, Akron; Daniel J. Lindner, Canal Fulton, both of Ohio; Henry T. Kwee, Luxembourg, Luxembourg; Michael A. Kolowski, Mogadore, Ohio; Harold D. Fetty, Birmingham, Mich.

[73] Assignee: The Goodyear Tire & Rubber Company, Akron, Ohio

[*] Notice: The portion of the term of this patent subsequent to Jan. 22, 1994, has been disclaimed.

[21] Appl. No.: 206,202

[22] Filed: Nov. 12, 1980

Related U.S. Application Data

[63] Continuation of Ser. No. 877,788, Feb. 14, 1978, abandoned.

[51] Int. Cl.³ .............................................. B60C 11/04
[52] U.S. Cl. ................................................ 152/209 R
[58] Field of Search ....................... 152/209 R, 209 D; D12/147, 140, 141, 136, 137

[56]     References Cited
        U.S. PATENT DOCUMENTS

| | | | |
|---|---|---|---|
| D. 65,630 | 9/1924 | Braender | D12/147 |
| D. 67,729 | 6/1925 | Waters | D12/147 |
| D. 201,858 | 8/1964 | Blankenship | D12/149 |
| D. 236,888 | 9/1975 | Verdien | D12/147 |
| D. 246,364 | 11/1977 | Candiliotis | D12/151 |
| D. 254,000 | 1/1980 | Kolowski et al. | D12/147 |
| B. 522,568 | 4/1976 | Blankenship | D12/147 |
| 2,454,750 | 11/1948 | Woods | D12/134 |
| 3,799,231 | 3/1974 | Boileau | 152/209 R |
| 3,926,238 | 12/1975 | Vorih | 152/209 R |

OTHER PUBLICATIONS

Advertisement for U.S. Rubber Company in Washington Star on Apr. 18, 1977.

*Primary Examiner*—Michael W. Ball
*Attorney, Agent, or Firm*—Frank Pincelli

[57]     ABSTRACT

A tread capable of being used in all seasons and weather conditions comprising of a substantially centrally located rib which extends circumferentially about the tire, a plurality of independent projections placed about the remaining portion of the tire. The independent projections are placed so as to provide for two circumferentially extending grooves, one on either side of the central rib and a plurality of laterally extending grooves which extend from each central groove to the tread edge of the tire. The tread has a low net to gross ratio.

1 Claim, 3 Drawing Figures

TREAD FOR PNEUMATIC TIRE

This is a continuation of application Ser. No. 877,788 filed Feb. 14, 1978, now abandoned.

The foregoing abstract is not to be taken as limiting the invention of this application, and in order to understand the full nature and extent of the technical nature of this application, reference must be made to the accompanying drawings and the following detailed description.

BACKGROUND OF THE INVENTION

This invention relates to pneumatic tires, more particularly to the tread portion of a pneumatic tire.

It is well-known in the tire industry that the choice of a particular tread design involves trade-off between specific tire performance characteristics in order to achieve the overall desired tire performance. For example, a tread design which has good wet traction or snow traction generally has poor dry traction, handling, and/or noise levels; a tire which generally has good dry traction, handling and tread wear characteristics generally has poor wet and snow traction. Conflicting tire characteristics such as these make it difficult to produce a tread pattern suitable for the various road conditions experienced during the entire year.

Applicants have discovered a particular tread arrangement suitable for use in all seasons which provides for good wet and snow traction while still maintaining good dry traction, tread wear, noise levels and handling.

DETAILED DESCRIPTION OF THE INVENTION

Figure 2:
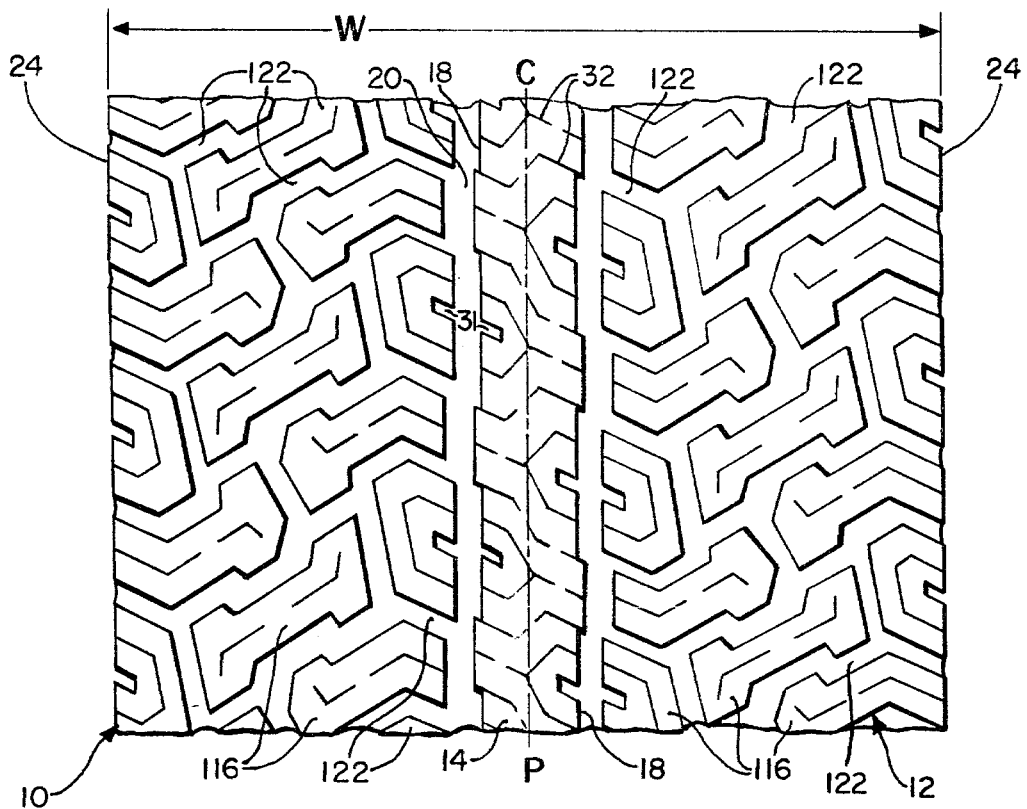
FIG. 2 is a fragmentary plan view of a modified tread of a pneumatic tire made in accordance with the present invention.

Referring to the drawing, there is illustrated a fragmentary view of a tire 10 made in accordance with the present invention having a tread portion 12. It should be understood that the tread portion 12 extends circumferentially about the tire 10 in like manner. The tread portion 12 comprises of a circumferentially extending central rib 14 and a plurality of independent projections or buttons 16 placed in the remaining portion. For the purposes of this invention, an independent projection or button shall be considered a projection which has its length substantially less than one-half the width of the footprint of the tire.

Figure 1:
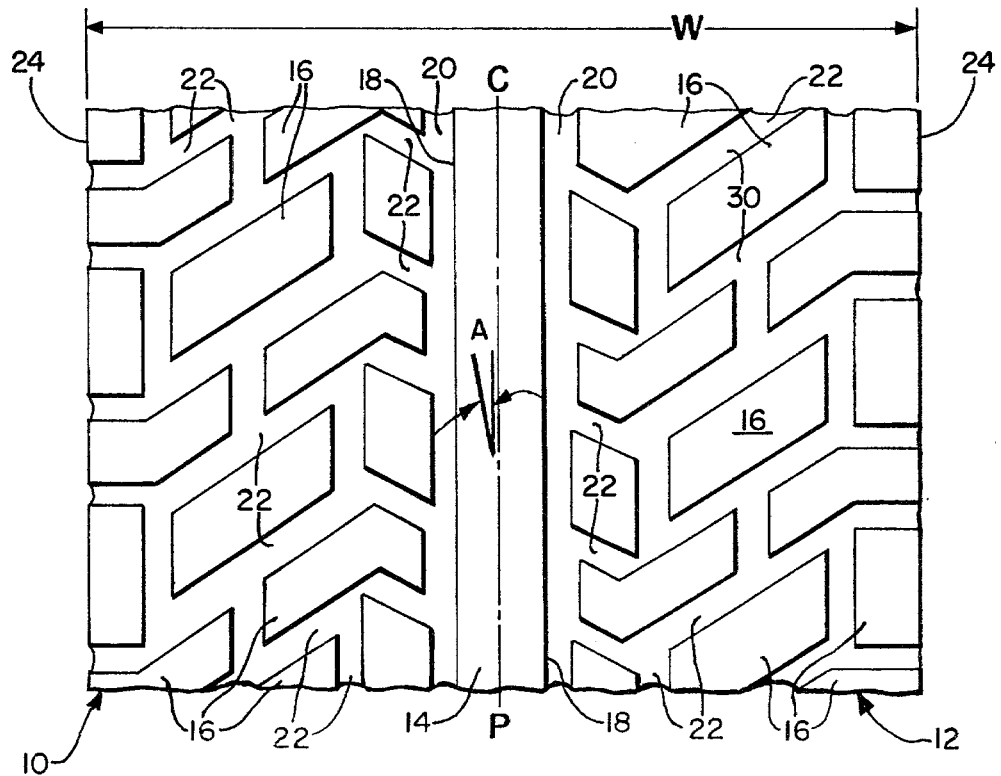
FIG. 1 is a fragmentary plan view of a tread of a pneumatic tire made in accordance with the present invention.
Figure 3:
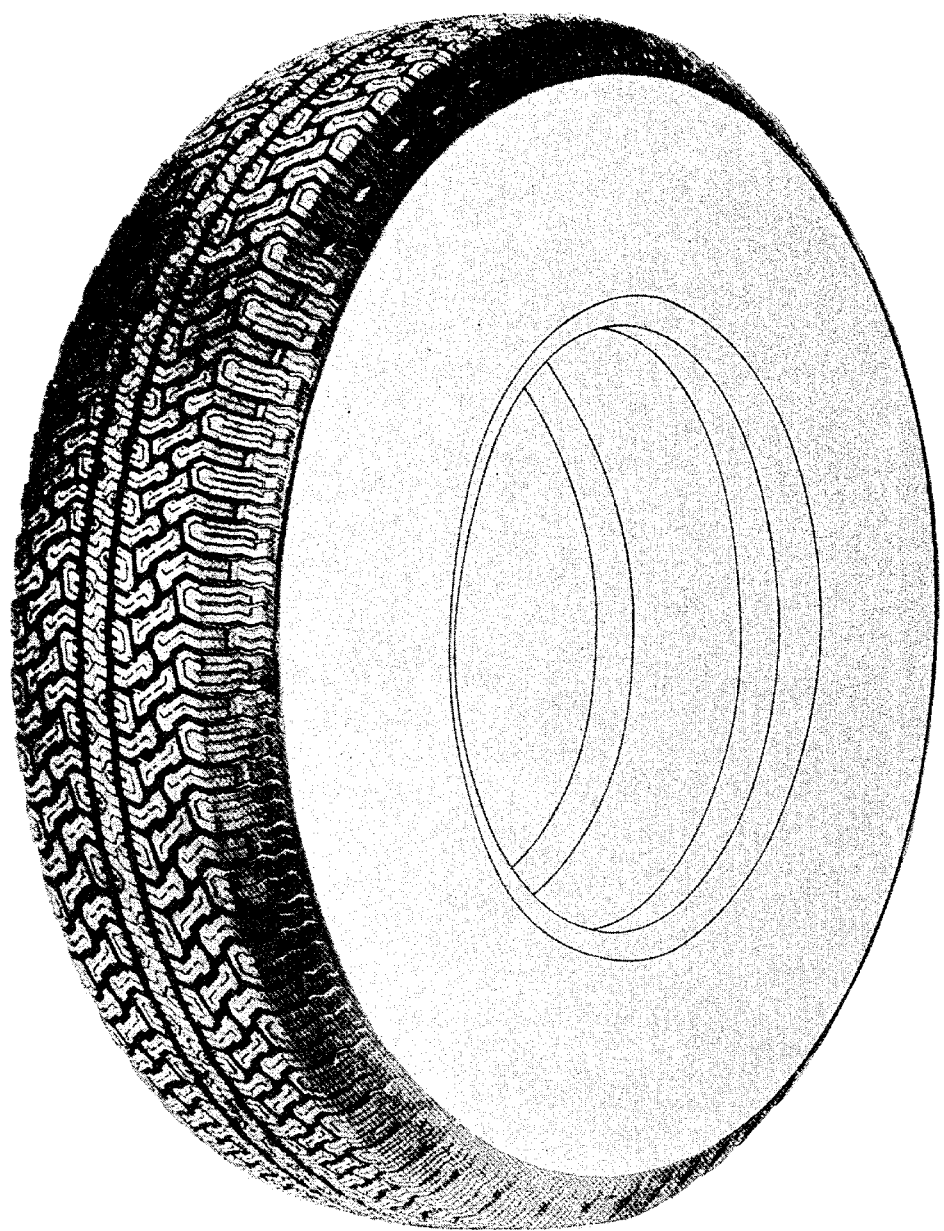
FIG. 3 is a perspective view of the tire of FIG. 2 being in accordance with the present invention.

The central rib 14 is continuous without any axial breaks, that is, without any notches, bladings or other features which extend continuously axially across the rib 14 and is located substantially in the central portion of tread portion 12. The axial edges 18 of rib 14 form an angle with the mid-circumference plane not greater than 10°, preferably, the edges 18 form an angle A not greater than 5°. In FIG. 1, angle A is zero The width of rib 14 may range from about 5% to 20% of the tread width W, preferably approximately 12%. For the purposes of this invention, the tread width W is the axial distance between the tread edges as measured from the footprint of the tire inflated to design inflation pressures and at rated load. The rib 14 contributes to noise reduction by minimizing vibrations in the central portion of the tread 12. The central rib 14 may be further provided with substantially axially extending sipes or notches for improved traction preferably, the radial depth of these sipes or notches is at least 25% the depth of grooves 20 in between projections 16. It is desirable that the notches 31 or sipes 32 do not extend axially across rib 14 more than 50% of the axial width of the rib 14.

Adjacent longitudinal edges 18 of rib 14 are continuous circumferentially extending grooves 20. Preferably there are no other continuous grooves in tread 12 which extend substantially about the circumference of tire 10.

Extending from each central groove 20 axially outward to the nearest respective tread edge 24 are a plurality of lateral grooves 22. The lateral grooves 22 extend from said central grooves to tread edges 24 in a substantially uninterrupted manner. For the purpose of this invention, a substantially uninterrupted groove shall be defined as a groove in which its width remains substantially the same over its entire length. In order to improve water removal from the contact area of the tire, grooves 22 preferably extend in a substantially radial direction in the areas of high unit pressure. The unit pressure exerted on a tire in the footprint thereof generally varies axially across the tread 12; this variation being more pronounced in passenger tires. The unit pressure is greatest at the lateral edges of the tread and decreases to a low somewhere in between the tread edge and the mid-circumferential centerplane CP of the tire and then gradually increases to a higher unit pressure in the central area of the tread, the highest unit pressures occurring at the lateral edges. A graphical representation of the unit pressure as viewed in a radial cross-sectional plane would be in the shape of a "W", the peaks being at the shoulder areas and at the center line. Therefore, lateral grooves 22 in the central portion of the tread extend substantially in a transverse direction from central grooves 20 to a point spaced approximately a distance of 10% to 20%, preferably 15%, of the tread width W from the centerplane CP. Grooves 22, from this point, travel in a direction such that it forms an angle which is equal to or greater than 50° with respect to the mid-circumferential plane CP of the tire 10 to a point spaced a distance from the tread edge approximately 15% to 25%, preferably 20%, of the tread width W and then travels in a substantially transverse direction.

The tread 12 is such that the net to gross ratio is less than 65%. For the purposes of this invention, net to gross is defined as the ratio between the area of the tread that is in actual contact with the road as a percentage of the total gross area of the footprint.

In the embodiment illustrated, the projections 16 are illustrated as block-type in configuration. However, it should be understood that projections 16 may take many other forms. For example, FIG. 2 illustrates an alternative configuration of projections 16. The tread illustrated in FIG. 2 is a plurality of projections 116 provided with internal blading. It can further be seen that grooves 122, which correspond to grooves 22 in FIG. 1, need not be straight but may have small jogs therein, preferably, these jogs are no greater than the width of the lateral grooves in the tread 12.

While certain representative embodiments and details have been shown for the purpose of illustrating the invention, it will be apparent to those skilled in the art that various changes and other modifications may be made therein without departing from the invention.

We claim:

1. A pneumatic passenger tire having a carcass structure, a ground-engaging tread portion disposed circumferentially about said carcass structure, a pair of annular bead portions, one at each of the radial inner ends of said carcass structure, said tire characterized in that the tread portion comprises:

a continuous circumferentially extending rib located substantially in the central portion of said tread portion, the overall circumferential direction of the axial sides of said rib form an angle with respect to the midcircumferential plane of tire no greater than about 10°;

a plurality of independent projections placed circumferentially about the remaining portion of said tread portion so as to provide two continuous circumferentially extending grooves one on each side of said rib and a plurality of laterally extending grooves which extend from each of said circumferentially extending grooves toward the closest respective tread edge of said tire in a substantially uninterrupted manner, said laterally extending grooves and said pair of circumferentially extending grooves having no jogs which are greater than the width of said laterally extending grooves, said tread portion having no other substantially circumferentially extending grooves, said lateral grooves follow a substantially transverse path from said central groove axially outward toward a first point spaced from the midcircumferential plane of said tire a distance of approximately 10% to 20% of the width of said tread and then follows a path from said first point to a second point so that such lateral grooves form an angle of at least 50° with respect to the midcircumferential centerplane of said tire between said first and second points, said second point being spaced from said tread edge a distance of about 15% to 20% of said width of said tread, said lateral grooves follow a path from said second point axially outward to said tread edge in a substantially transverse direction, said central rib is provided with a plurality of sipes or notches, said sipes or notches extend axially across the width of said rib a distance not greater than 50% of the axial width of said rib, the depth of said sipes are not less than 25% of the depth of the grooves in between said projection, wherein said independent projections adjacent said central groove and adjacent said tread edge having a circumferential length such that said adjacent projections alternate in circumferential length in the ratio of about two to one, the net to gross of said tread is less than 65 percent.

* * * * *